Figure 1:
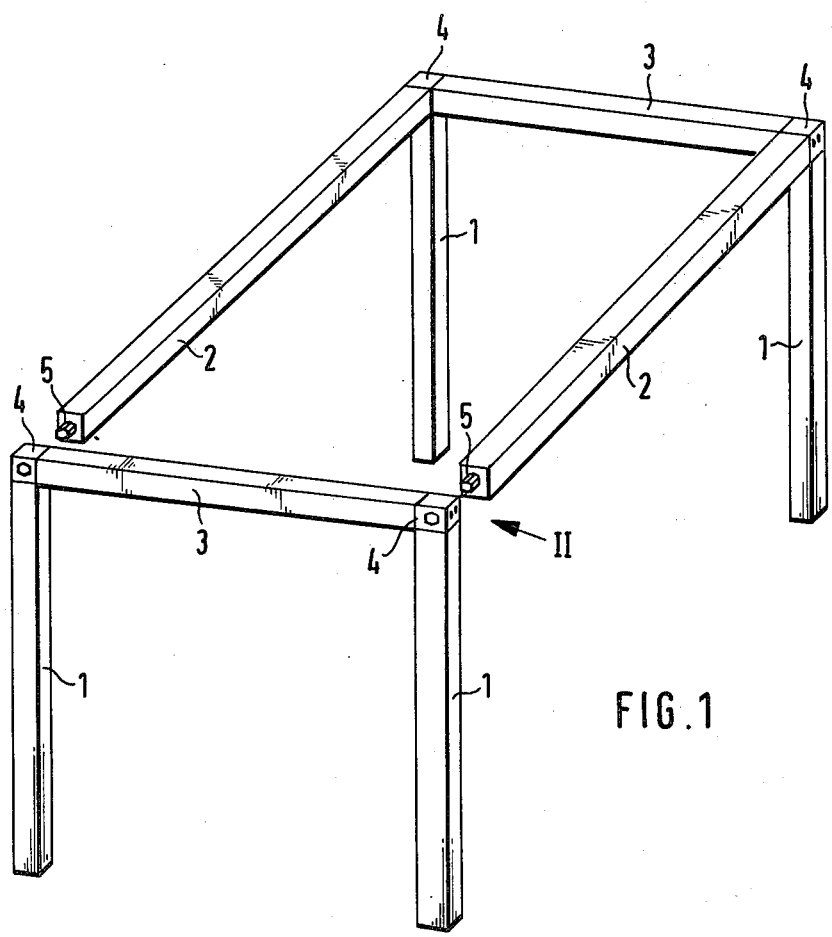

United States Patent [19]

Becker et al.

[11] 4,435,103
[45] Mar. 6, 1984

[54] CONNECTION FOR FURNITURE FRAME PARTS, PARTICULARLY OFFICE FURNITURE

[76] Inventors: Norbert Becker, Weringhauser Strasse 15, D-4782 Erwitte 2; Norbert Hildebrandt, Grüner Winkel 32, D-4782 Erwitte 1, both of Fed. Rep. of Germany

[21] Appl. No.: 311,119

[22] Filed: Oct. 14, 1981

[30] Foreign Application Priority Data

Oct. 18, 1980 [DE] Fed. Rep. of Germany ....... 3039389

[51] Int. Cl.³ .................... F16B 7/00; F16B 12/36; F16B 13/00
[52] U.S. Cl. .................................. 403/292; 248/188; 297/440; 403/362; 403/263
[58] Field of Search ............. 403/292, 362, 263, 231; 197/440; 108/156, 111; 211/182; 52/645, 648; 248/165, 188 R; 182/178; 312/257 SK, 263, 264, 265

[56] References Cited

U.S. PATENT DOCUMENTS

| 2,654,234 | 10/1953 | Christensen | 403/292 X |
| 3,462,021 | 8/1969 | Hawke et al. | 211/182 |
| 3,507,508 | 4/1970 | Andrews | 403/362 |
| 4,172,341 | 10/1979 | Klein, Sr. | 403/362 X |
| 4,177,685 | 12/1979 | De Lancey | 403/362 X |

Primary Examiner—Wayne L. Shedd
Attorney, Agent, or Firm—Pollock, Vande Sande and Priddy

[57] ABSTRACT

A furniture frame includes a first frame part with a dowel extending beyond the end thereof into an opening in a second frame part. A securing screw is provided in the second frame part at right-angles to the dowel axis. When the screw is tightened, two abutting surfaces inclined at an angle to the central plane of the dowel are pressed against corresponding, inclined surfaces in the opening. A releasable, but nevertheless very rigid connection of the various elements is thus achieved.

8 Claims, 6 Drawing Figures

CONNECTION FOR FURNITURE FRAME PARTS, PARTICULARLY OFFICE FURNITURE

The invention relates to an improved connection for frame parts of furniture.

In a known furniture connection arrangement, one frame part provides the female half of the connection and has a cylindrical zone in the center of said female half which opens conically to each side. The male half of the connection is provided on another frame part and comprises a dowel which is cylindrical at its outer end and conical at the base. A threaded bore extends longitudinally through the dowel. A plug, corresponding in form to the dowel, is fitted into the other side of the female half. The plug has a hole throughout which aligns with the threaded bore in the dowel. A connecting screw is inserted through the hole in the plug into the threaded bore in the dowel, and a secure connection of the two frame parts is achieved by tightening the screw. On tightening the screw, the first frame part is drawn firmly against the side surface of the second frame part.

A disadvantage of this known connection is the fact that it is difficult to adjoin several frame parts continuously because access to the securing screws is prevented.

The purpose of the present invention is to so construct a connection that, on the one hand, a quick and reliable connection between the various frame parts is ensured, and on the other hand, any desired number of frame parts may be joined together without difficulty.

The connection according to the invention is assembled in an extremely simple manner. It comprises a specially shaped dowel which extends outwardly from one frame part and which is inserted into a specially shaped opening in the the second frame part, whereafter the dowel can be wedged into firm engagement with interior surfaces of the opening by tightening securing screws at the side. Such a connection allows not only a quick and reliable attachment, but also provides easy releasability.

When the dowel extends only throughout a part of the depth of the said opening, sufficient space remains for adjoining a further horizontal first frame part to the second frame part. In this case, two securing screws are provided in the second frame part, parallel to each other, which are then tightened.

An especially firm connection results from the fact that the dowel has two abutting surfaces inclined at an angle to its longitudinal central plane, and that two corresponding, inclined surfaces are also provided in the opening. Preferably, the angle of inclination of the abutting dowel surfaces is slightly larger than the angle of inclination of the corresponding surfaces in the opening. The angular difference is preferably less than 1°.

The converging inclination of the abutting surfaces in the opening and the corresponding surfaces results in the dowel being pressed extremely firmly against the inner surfaces of the female half of the connection when the securing screws are tightened. The high pressure exerted by the screws is distributed over large surface areas that abut one another so that the specific surface pressure in this connection remains low.

It has proved particularly advantageous that the abutting dowel surfaces and the corresponding opening surfaces are inclined at an acute angle to the longitudinal central plane of the dowel or of the opening. The acute inclination of these surfaces results in a desired wedge effect which leads to the desired rigid locking of the dowel in the female half of the connection.

Suitably, the form of the dowel and of the surfaces in the opening are such that when the dowel is secured, the surface opposite to the surface to which the screw is applied remains spaced from the wall it faces in the opening. The rigidity of the connection is thus determined exclusively by the tightness of the screws.

In a further preferred embodiment of the invention, the dowel is angled. It is also possible to provide the dowel with a Y shape.

The advantage of such angled or Y-shaped dowels is that frame parts can be joined together that are not at right-angles to each other. With a Y-shaped arrangement, three frame parts can be interconnected as might be required for example at the corner connection of a desk combination.

Figure 2:
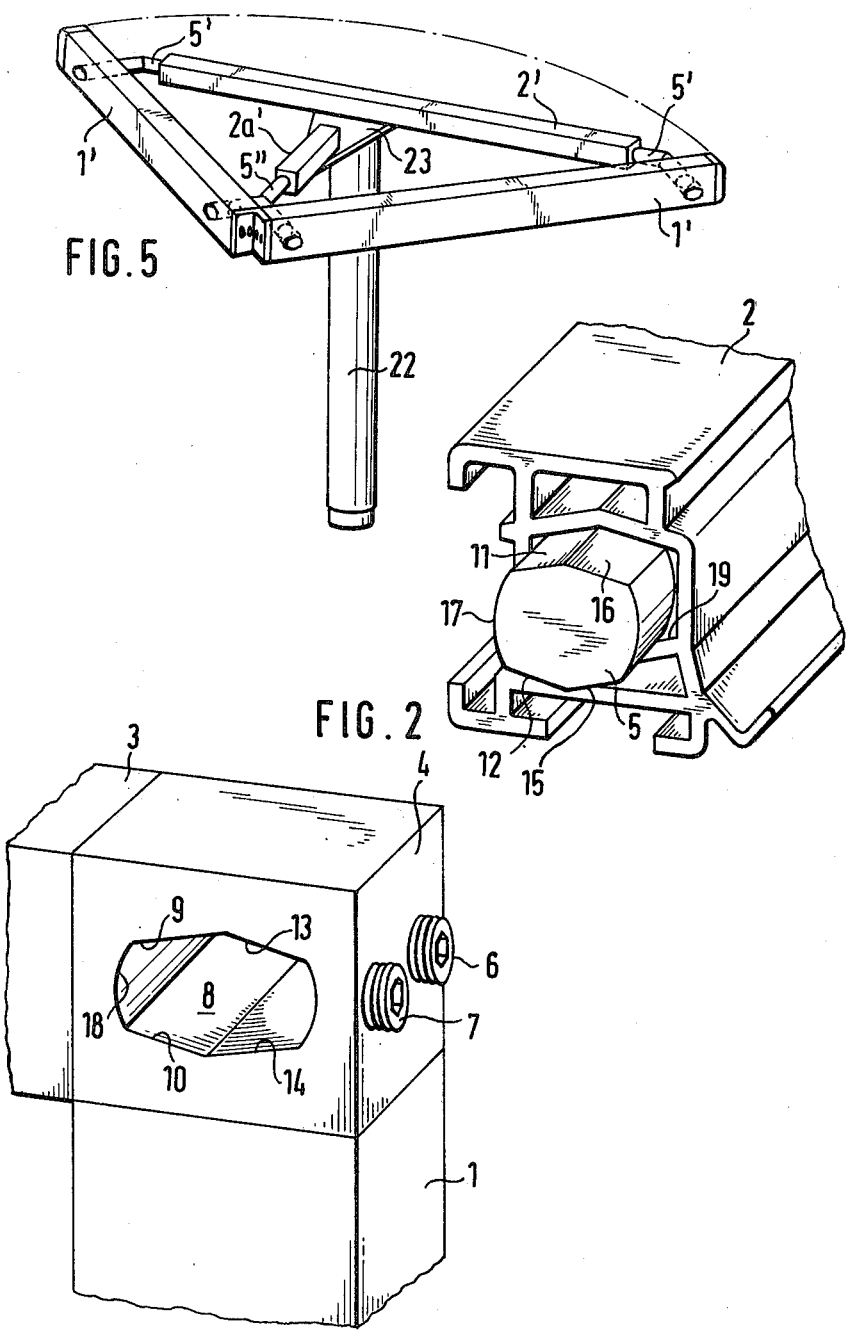
Figure 3:
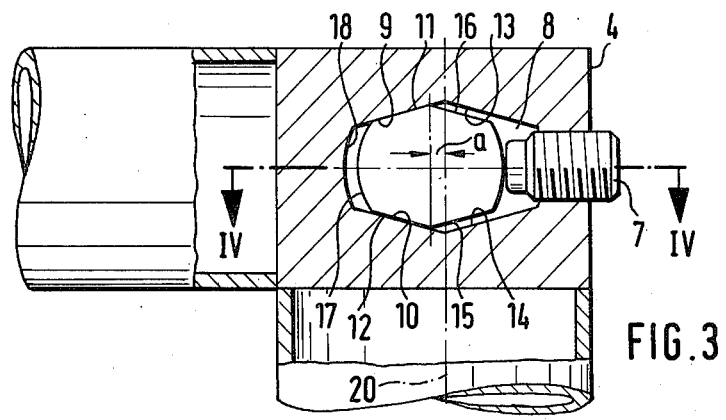
Figure 4:
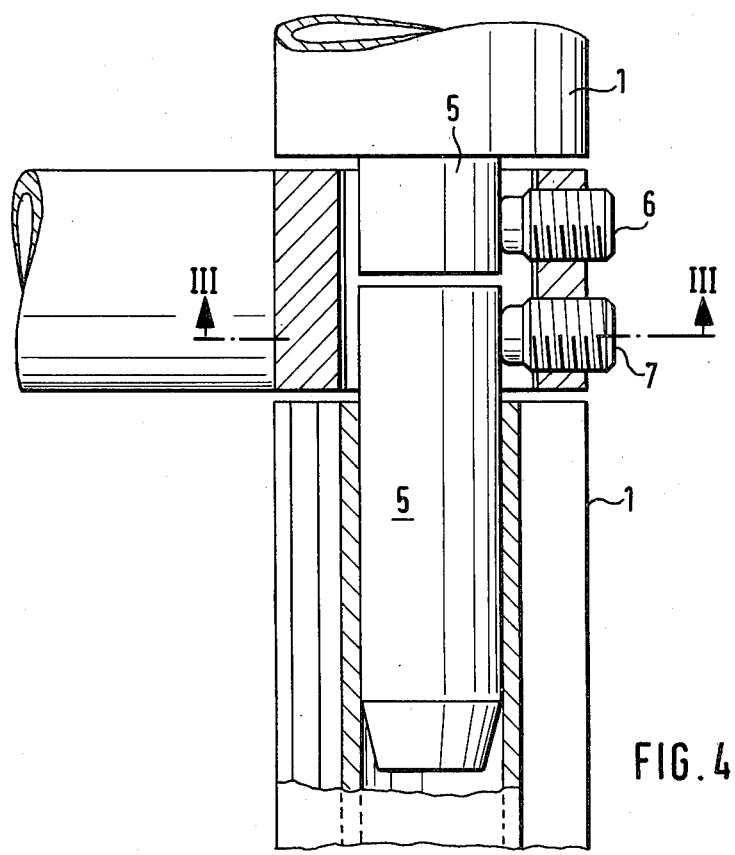

In the following, preferred embodiments of the invention will be described in detail with the aid of the drawings. Showing in:

FIG. 1: a perspective view of frame parts of an office desk, partly in exploded representation, FIG. 2: a perspective view of the detail II in FIG. 1, enlarged, FIG. 3: a section through plane III—III in FIG. 4, FIG. 4: a section through plane IV—IV in FIG. 3, and FIG. 5: a perspective view of a corner connection of several adjoined frame parts.

In the illustrated embodiment, the legs 1 of a furniture unit are connected to one another by horizontal struts 2 which have a profiled cross section as best seen in FIG. 2. Two legs 1 are each connected to one another via a short strut 3.

At the corners formed by the legs 1 and the short struts 3, female halves 4 of the connection with openings 8 (FIG. 2) are provided.

At the ends of the profile struts 2 are dowels 5 which protrude beyond the ends of the struts 2. The dowels are secured, for example by being press fit into chambers 19 in the profile.

The dowel 5 has abutting exterior surfaces 11 and 12 which bear against corresponding interior surfaces 9 and 10 of opening 8 when the dowel 5 is fitted in the opening 8 of the female half 4 of the connection. A securing screw 6 or 7 is in thread engagement with female half 4 of the connection, extends into opening 8 (see FIG. 3), and when tightened presses the dowel surfaces 11 and 12 against the corresponding opening surfaces 9 and 10 in the female half 4. The leading surface 17 of the dowel remains distant from the opposing surface 18 located between the contact opening surfaces 9 and 10 even when the connection is tightened. Behind the abutting surfaces 11 and 12 are oppositely inclined surfaces 15 and 16 on the dowel 5, and oppositely inclined surfaces 13 and 14 in the opening 8.

When the securing screws 6 and 7 are tightened, the center of the dowel 5 is offset by the distance a in relation to the vertical plane 20 through the upper and lower corners of the opening 8.

The abutting dowel surfaces 11 and 12, and the corresponding surfaces 9 and 10 in opening 8 are arranged at an acute angle to the horizontal plane IV—IV. These surfaces converge towards the horizontal plane at the side opposite to the securing screws 6 and 7.

In FIG. 4 can be seen how two first frame parts are arranged in continuation, and are connected to an intervening second frame part. The protruding dowels 5 from the first frame parts are inserted, one from each side, into the opening 8 and the securing screws 6, 7 are tightened.

Release of the connection presents no problem.

In the embodiment according to FIG. 5, several horizontal frame parts are interconnected to form the corner of a furniture unit. Arranged at right-angles to each other, the parts 2′ and 2a″ are joined by means of a plate 23. Beneath the plate is a supporting leg 22 which must necessarily be provided on all such corner connections.

The frame part 2′ has an angled dowel 5′ at each end. The frame part 2a′ has a Y-shaped dowel 5″ at its end. The free ends of the dowels 5′ extend into openings in the frame parts 1′. The free arms of the Y-shaped dowel 5″ also extend into other openings of the abutting frame parts 1′. Securing of the free ends of the dowels within the openings takes place in the manner described and illustrated in connection with FIGS. 1 to 4.

The connecting plate 23 can be so constructed that the distance between the rear end of frame part 2a′ and frame part 2′ is adjustable. The construction shown in FIG. 5 can be assembled completely free of stress, and necessary adjustments when erected are easily possible.

We claim:

1. A furniture frame comprising first and second frame members connected to one another, said first frame member having a dowel extending outwardly thereof, said second frame member having an elongated opening therein, said dowel extending into said opening, said dowel having a pair of spaced exterior planar surfaces which are disposed on opposite sides of the longitudinal central plane of said dowel and which are inclined at angles to said longitudinal central plane of said dowel, said opening having a pair of spaced interior planar surfaces which are disposed on opposite sides of the longitudinal central plane of said opening and which are inclined at angles to said longitudinal central plane of said opening, said inclined exterior dowel surfaces being in abutment with said inclined interior surfaces of said opening respectively, the angles of inclination of said exterior dowel surfaces being slightly greater than the angles of inclination of said interior opening surfaces, and a screw member in thread engagement with said second frame member and extending into said opening at right angles to the longitudinal axis of said dowel, said screw member being positioned to engage an exterior side of said dowel and to apply a force thereto in a direction transverse to said axis of said dowel to press said inclined exterior surfaces of said dowel into forceable engagement with said differently inclined interior surfaces of said opening thereby to securely connect said first and second furniture frame members to one another.

2. The furniture frame of claim 1 wherein the angular difference between the angles of inclination of said abutting dowel and opening surfaces is less than 1°.

3. The furniture frame of claim 1 wherein said dowel extends only partially into the depth of said opening from one end of said opening, a further frame member having a further dowel extending only partially into the depth of said opening from the other end of said opening, said further dowel also having a pair of spaced inclined exterior planar surfaces which are in abutment with said inclined interior planar surfaces of said opening, and a further screw member disposed in thread engagement with said second frame member and in spaced parallel relation to said first-mentioned screw member for engaging said further dowel to press the inclined exterior surfaces of said further dowel into forceable engagement with said inclined interior surfaces of said opening.

4. The furniture frame of one of claims 1, 2 or 3 wherein each of said planar surfaces is inclined at an acute angle to a horizontal plane passing through said dowel and opening, the surfaces in each pair of surfaces converging toward said horizontal plane at the side of said dowel opposite to the side which is engaged by said screw member.

5. The furniture frame of one of claims 1, 2 or 3 wherein said dowel includes a further pair of spaced exterior planar surfaces which are disposed on opposite sides of the longitudinal central plane of said dowel and which are inclined to said longitudinal central plane in a direction of inclination opposite to the inclination of said first-mentioned pair of spaced exterior surfaces, said further pair of spaced exterior surfaces being disposed between said first-mentioned pair of exterior surfaces and the portion of said dowel which is engaged by said screw, said opening including a further pair of spaced interior planar surfaces disposed on opposite sides of the longitudinal central plane of said opening in opposing relation to said further pair of exterior surfaces respectively, the angles of inclination of said further pair of exterior planar surfaces corresponding to the angles of inclination of said further pair of interior planar surfaces.

6. The furniture frame of one of claims 1, 2 or 3 wherein said dowel includes a further exterior surface extending between said pair of inclined exterior planar surfaces, said opening including an interior wall extending between said pair of inclined planar interior surfaces on the side of said opening opposite to said screw member, the dimensions of said dowel and opening being such that said further exterior surface of said dowel remains spaced from said interior wall of said opening when said inclined exterior surfaces of said dowel have been pressed into forceable engagement with said inclined interior surfaces of said opening by said screw member.

7. The furniture frame of one of claims 1, 2 or 3 wherein said dowel is angled in its direction of extension.

8. The furniture frame of one of claims 1, 2 or 3 wherein said dowel comprises one leg of a Y-shaped dowel member.

* * * * *